United States Patent [19]

Oldfield et al.

[11] 4,287,717
[45] Sep. 8, 1981

[54] TURBOCHARGED INTERNAL COMBUSTION ENGINE

[75] Inventors: Thomas A. Oldfield; Edward D. Smith, both of Columbus, Ind.; Hideo Furukawa, Oyama, Japan

[73] Assignees: Cummins Engine Company, Inc., Columbus, Ind.; Kabushiki Kaisha Komatsu, Seisakusho, Tokyo, Japan

[21] Appl. No.: 906

[22] Filed: Jan. 4, 1979

[51] Int. Cl.³ .................................................. F02B 37/00
[52] U.S. Cl. ............................................ 60/606; 415/27
[58] Field of Search ................ 60/600, 606, 611; 123/119 C; 415/27; 417/307

[56] References Cited

U.S. PATENT DOCUMENTS

| | | | |
|---|---|---|---|
| 1,052,172 | 2/1913 | Rateau | 415/27 |
| 2,559,623 | 7/1951 | Holmes | 415/27 X |
| 2,654,991 | 10/1953 | Nettel | 60/606 X |
| 2,813,672 | 11/1957 | Long et al. | 415/27 |
| 3,047,210 | 7/1962 | Best | 415/27 |
| 3,473,727 | 10/1969 | Eastman | 415/27 |
| 3,949,555 | 4/1976 | Melchior | 60/606 |

Primary Examiner—Michael Koczo, Jr.
Attorney, Agent, or Firm—Merriam, Marshall & Bicknell

[57] ABSTRACT

This disclosure relates to a turbocharged low compression ratio diesel engine. An air by-pass is connected in parallel with the engine and is operable to by-pass a portion of the compressor output around the engine and into the exhaust manifold. A control is connected in the by-pass to regulate the amount of by-passed air, the control operating in response to the compressor output. The by-pass further includes means for heating the air flowing to the turbine to aid fuel combustion in the engine cylinders.

7 Claims, 4 Drawing Figures

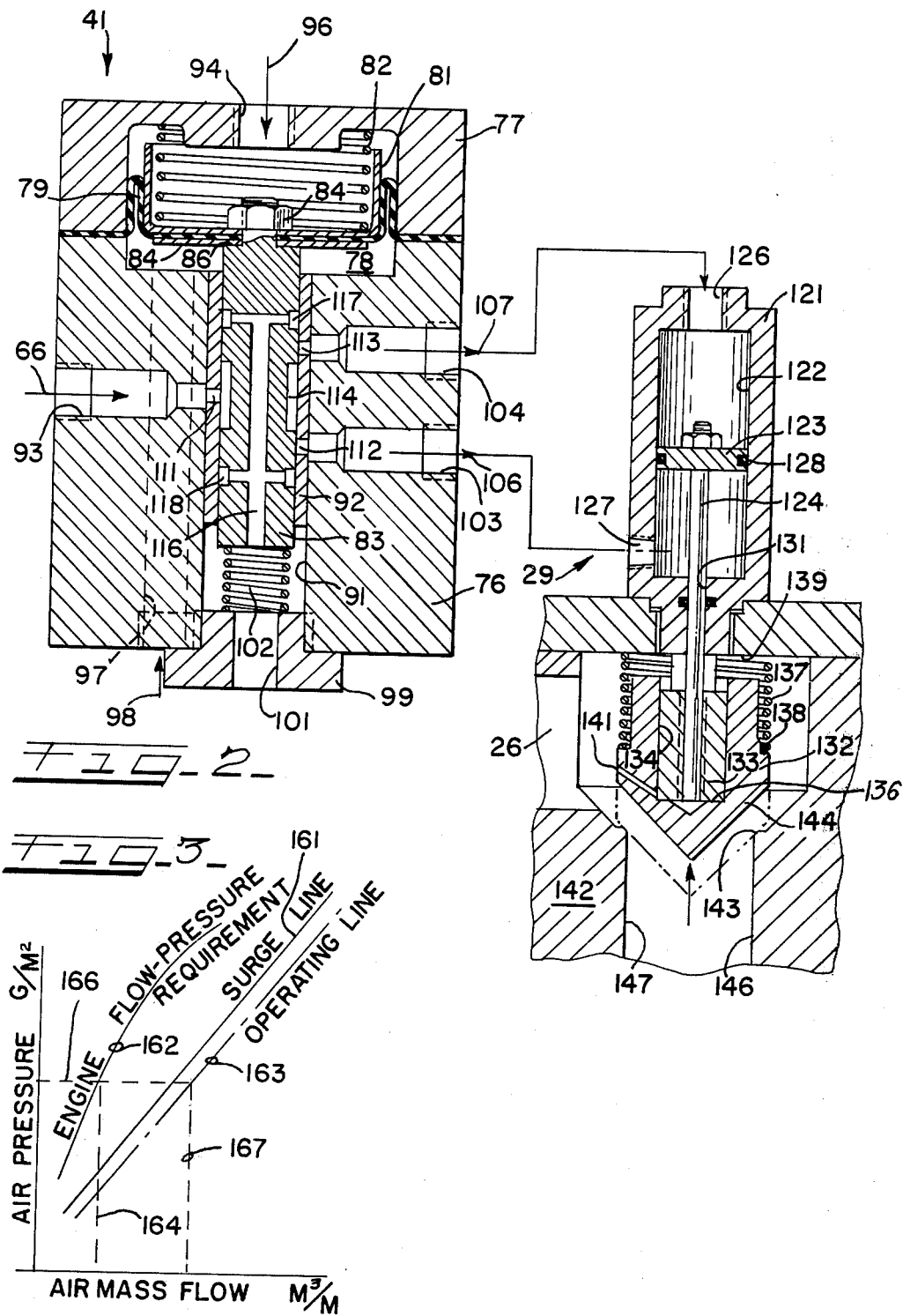

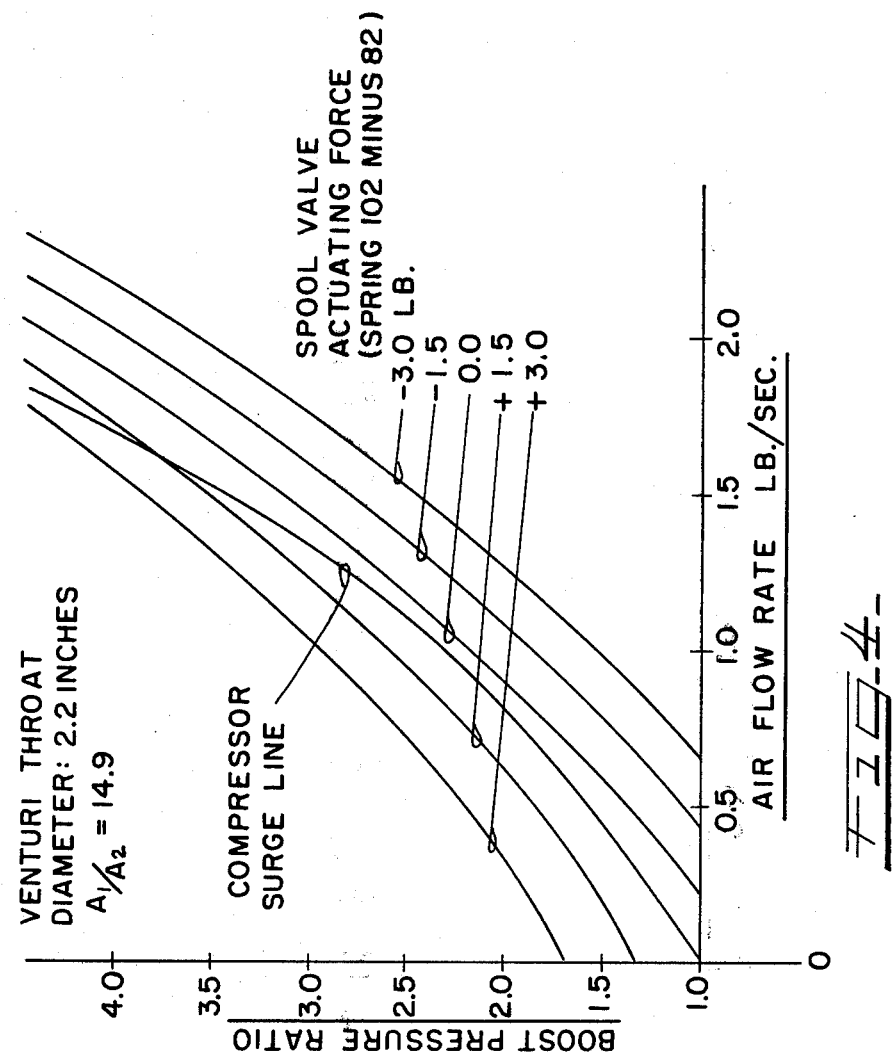

TURBOCHARGED INTERNAL COMBUSTION ENGINE

In an ordinary turbocharged diesel engine, the turbocharger is matched to the engine in terms of the mass flow of air through the engine and the air pressure boost required to obtain the desired engine operating characteristics. The turbocharger is normally designed to operate as close as possible to the compressor surge line in order to obtain maximum operating efficiency of the engine.

Special problems are encountered however when the engine is a low compression ratio (LCR) engine. Such an engine may be defined generally as one having a compression ratio of less than about 12 to 1. A diesel engine requires a minimum cylinder pressure to initiate combustion in the cylinders which is critical during start-up and warm-up. This requirement forms special problems in an LCR engine because of the relatively low compression. A turbocharger is usually provided to increase the air pressure being fed to the engine cylinders. However, the air pressure required at certain engine speeds would require that the compressor operate under surge conditions, which of course is not practical. Since an LCR diesel engine is difficult to start when it is cold, a starting aid is often provided to preheat the intake air.

It is a general object of the present invention to provide an LCR diesel engine includes improvements for eliminating the problems of poor combustion at starting and light load.

A diesel engine in accordance with this invention includes a turbocharger and an air by-pass pipe connected in parallel with the engine and allowing the compressor output to bypass into the turbine inlet. A control is connected in the by-pass pipe for adjusting the quantity of air flowing through the pipe, and the control operates in response to the mass of air flowing from the compressor. The by-pass further includes means for inducing air flow through the by-pass at engine start-up and for heating the air flowing to the turbine, in order to assist in operating the turbocharger during the engine start-up and warm-up.

The foregoing and other objects and advantages of the present invention will become more apparent from the following detailed description taken in conjunction with the accompanying figures of the drawings, wherein;

FIG. 2 is a sectional view of an air by-pass control of the engine; and

FIGS. 3 and 4 show curves illustrating the operation of the engine.

Figure 1:
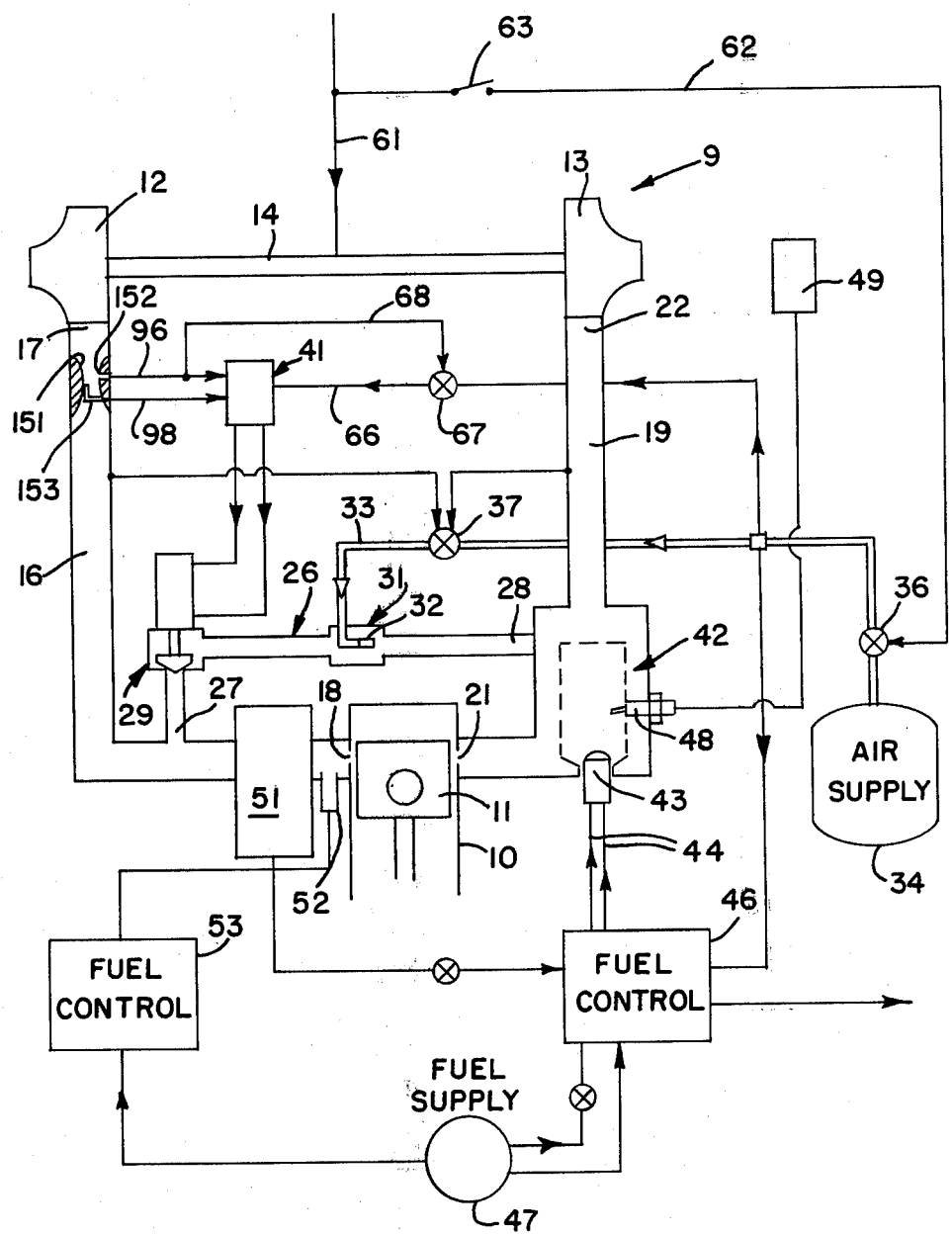
FIG. 1 is a schematic diagram of a diesel engine including a turbocharger and a by-pass in accordance with the present invention.

FIG. 1 illustrates an engine including features in accordance with the present invention. Such an engine normally includes a plurality of engine cylinders and reciprocating pistons, and one such cylinder 10 and piston 11 are shown schematically in FIG. 1. The engine further includes a turbocharger 9 including a compressor 12 and a turbine 13 which are connected by a drive shaft 14, the shaft 14 having its opposite ends connected to the rotors of the compressor and the turbine. An air intake manifold 16 connects the output 17 of the compressor 12 with the air intake port 18 of the cylinder 10, and an exhaust manifold 19 connects the exhaust port 21 of the cylinder 10 with the intake 22 of the turbine 13. As is well known to those skilled in the art, during operation of the engine exhaust flows out of the engine cylinders and through the exhaust manifold 19 and drives the turbine 13. The turbine 13 drives the compressor 12, and the compressor supplies intake air having a pressure boost to the intake manifold 16.

The engine further includes a by-pass pipe 26 having an inlet end 27 connected to the intake manifold 16 and an outlet end 28 connected to the exhaust manifold 19. Connected in the pipe 26 between the two ends 27 and 28 are a flow control or surge control valve 29, shown in FIG. 2, and an air ejector 31. The ejector 31 includes an air nozzle 32 that is directed to eject a jet or stream of air in the downstream direction in the pipe 26, which is toward the exhaust manifold. The nozzle 32 is connected by a tube 33 to a compressed air supply 34. Two control valves, to be described hereinafter, indicated by the numerals 36 and 37 are connected in the tube 33, and when the two valves 36 and 37 are open, a stream or jet of air flows through the nozzle 32 and induces the flow of air through the pipe 26 toward the exhaust manifold 19. Normally the air flowing through the pipe 26 flows through the valve 29, but in the event the valve 29 is closed, means (not shown) may be provided in the pipe 26 upstream from the nozzle 32 to permit the flow of air through the ejector 31.

The flow control valve 29 is connected to a control mechanism 41 (FIGS. 1 and 2) which adjusts the valve 29 in order to regulate the amount of by-passed air, and the control mechanism 41 responds to the output of the compressor 12 as will be described hereinafter.

Connected in the exhaust manifold 19 is an exhaust manifold burner 42 which is designed to burn fuel in the exhaust manifold 19 in order to supply additional amounts of heated air to drive the turbine 13. The exhaust manifold burner 42 includes a fuel nozzle 43 which receives fuel through fuel lines 44 from a fuel flow control unit 46 and a fuel supply 47. A spark plug 48 is connected in the manifold burner 42 in order to ignite the fuel sprayed into the burner combustion chamber by the nozzle 43, the spark plug 48 being connected to an exciter 49 which provides electrical energy to the spark plug 48.

The engine may also include parts to improve the operating efficiency of the engine, such as an air aftercooler 51 connected in the intake manifold 16 ahead of the intake port 18 of the cylinder. An intake air manifold burner 52 may be connected in the intake manifold 16 between the aftercooler 51 and the port 18, which operates as a combustion aid. A fuel control unit 53 is connected between the fuel supply 47 and the burner 52 in order to regulate the flow of fuel to the burner 52.

The engine further includes various control features which regulate the operation of the component parts and protect some of the parts against damage. For example, a line 61, which forms part of the engine lubricant system, is connected to lubricate the turbocharger shaft 14, and a control line 62 senses the presence of lubricant pressure in the line 61 and thereby controls the opening and closing of the air valve 36. The line 62 includes a control switch 63 which senses the lubricant pressure and opens the air valve 36 only when lubricant pressure appears in the line 61. This feature prevents the ejector 31 from operating until the engine is turning over during starting and the shaft 14 is being lubricated. The valve 37 is a differential air pressure responsive valve which responds to the pressures in the intake manifold 16 and in the exhaust manifold 19 and opens the valve 37 when the air pressure in the intake manifold 16 is lower than the pressure in the exhaust manifold 19. When the manifold 16 pressure is higher than the manifold 19 pressure, operation of the ejector 31 is usually not required because the air will flow through the pipe 26 to the manifold 19 due to this pressure difference. The fuel flow control 46 senses the pressure in the tube 33 downstream of the valve 36, and the pressure of the air in the aftercooler 51, and controls the flow of fuel to the exhaust manifold burner nozzle 43. The control mechanism 41 receives high pressure air by a line 66 which is connected to the tube 33, and a valve 68 in the line 66 responds to the compressor 12 output pressure by means of a line 68.

The principle of operation of the control mechanism 41 and the flow control valve 29 is based on the discovery that the ratio of static pressure (FIG. 1, passage 96) to dynamic pressure (passage 98) is close to constant when the operating point is moved along at or close to and parallel to the surge line of the typical compressor map (see FIG. 3). The objective to be accomplished using this discovery is to cause the compressor to operate in a mode which is near peak efficiency and in the nonsurge region.

FIG. 2 illustrates in greater detail the control mechanism 41 and the flow control valve 29. The control mechanism 41 comprises a spool valve arrangement including a housing 76 and a cover 77. A diaphragm chamber is formed between the housing 76 and the cover 77, and a flexible diaphragm 79 is positioned between the housing 76 and the cover 77 and extends across the chamber 78. The diaphragm 79 forms a sealed connection between the housing 76 and the cover 77. Positioned on the upper side of the diaphragm 79 is a spring cup 81, and a compression spring 82 is mounted between the upper side of the cup 81 and the underside of the cover 77, the cup 81 and the spring 82 being located within the chamber 78. A centrally located hole is formed in the diaphragm 79 and in the cup 81, and the threaded upper end of a spool 83 extends through the holes and a nut 84 secures the spool 83 to the diaphragm 79 and to the spring cup 81. A flat pressure plate 84 is preferably provided between the underside of the diaphragm 79 and a ledge 86 formed on the upper end of the spool 83.

The housing 76 has a spool bore 91 and a plurality of air passages formed therein. The bore 91 receives a sleeve 92 which is secured in the bore 91 and which slidably receives the spool 83. A first passage 93 is connected to the line 66 (FIG. 1) that connects with the high pressure air supply 34. Another passage 94 connects with a line 96 (FIG. 1) that leads to the intake manifold 16, and another passage 97 connects with a line 98 that also leads to the intake manifold 16. The passage 94 leads to the chamber 78 on the upper side of the diaphragm 79 and the passage 97 leads to the chamber 78 on the lower side of the diaphragm 79.

The lower end of the spool bore 91 receives a threaded cap 99 having a central opening 101 formed therein, in order to vent or connect the lower end of the bore 91 to atmosphere. A compression spring 102 is located between the cap 99 and the lower end of the spool 83 and urges the spool 83 upwardly. Of course, the other compression spring 82 in the chamber 78 tends to move the diaphragm 79 and the spool 83 downwardly. In addition to the foregoing passages formed in the housing 76, two additional passages 103 and 104 are formed in the housing and respectively connect with lines 106 and 107 and with the bore 91.

The sleeve 92 has a hole 111 formed in it which connects the passage 93 with the interior of the bore 91. The sleeve 92 further has two additional holes 112 and 113 which connect the passages 103 and 104 with the bore 91. The spool 83 has an annular groove 114 formed in its outer periphery, the axial length of the groove 114 being slightly less than the axial distance between the holes 112 and 113, and in the neutral position of the spool 83 as shown in FIG. 2, the groove 114 is located between and does not connect with either of the holes 112 or 113. The other hole 111 is located, in the present specific example of the invention, substantially midway between the two holes 112 and 113 and the hole 111 is always in flow communication with the annular groove 114. It will be apparent from FIG. 2 that if the spool 82 is moved upwardly, the groove 114 will connect with the hole 113 and the passages 93 and 104 will be placed in flow communication by means of the groove 114, whereas if the spool 83 is moved downwardly, the groove 114 will connect with the hole 112 and the passages 93 and 103 will be placed in flow communication. It will also be apparent from FIG. 2 that the groove 114 will connect with only one of the two holes 112 and 113 at a time.

An axial vent passage 116 is formed in the spool 83. At its lower end the passage 116 connects with the vent 101, and the passage 116 also connects with annular grooves 117 and 118 formed in the outer surface of the spool 83 above and below the groove 114. The upper groove 117 is located so that when the spool 83 is moved downwardly and the groove 114 connects with the hole 112, the groove 117 will at the same time connect with the hole 113. Conversely, when the spool 83 is moved upwardly and the groove 114 connects with the hole 113, the groove 118 will connect with the hole 112. Consequently, if the line 66 receives high pressure air from the tank 34, the passage 103 will also be pressurized and the passage 104 will be connected to atmosphere when the spool 83 is displaced downwardly from the FIG. 2 position, and the passage 104 will be pressurized and the passage 103 will be connected to atmosphere when the spool 83 is displaced upwardly.

As previously and as shown in FIG. 1, the two lines 96 and 98 are connected to the intake manifold 16 of the engine. The line 96 is connected to respond to the static air pressure in the intake manifold 16 at the outlet 17 of the compressor 12, and the line 98 is connected to respond to the dynamic air pressure at the outlet 17.

The flow control valve 29 includes an air cylinder 121 having a bore 122 formed therein. A piston 123 is movably mounted in the bore 122, and a piston rod 124 connects with the piston 123 and extends out of the lower end of the cylinder 121. The line 107 is connected to a passage 126 which connects with the upper end of the bore 122, and the line 106 connects with another passage 127 which is at the lower end of the bore 122. Thus, the two lines 106 and 107 connect with the bore 122 on opposite sides of the piston 123. A seal 128 on the piston 123 prevents air flow past the piston.

The piston rod 124 extends out of the cylinder 121 through a sealed opening 131 and is connected to operate a by-pass valve which is connected in the pipe 26. The by-pass valve includes a valve member 132 which is connected to the lower end of the piston rod 124 by a lost-motion connection. The lost-motion connection is arranged such that the piston 123 and the rod 124 can apply a downwardly directed force on the valve 132 but not an upwardly directed force. The lost-motion connection includes a sleeve 133 attached to the lower end of the piston rod 124, the sleeve being slidably positioned within a cylindrical bore 134 formed in the valve member 132. The lower end of the sleeve is engagable with a ledge 136 at the lower end of the bore 134. Thus, downward movement of the piston rod 124 and the sleeve 133 causes the sleeve 133 to engage the ledge 136 of the valve member 132 and push the valve member 132 downwardly, but upward movement of the piston rod 124 and the sleeve 133 causes the sleeve 133 to slide upwardly in the bore 134 without producing an upwardly directed force on the valve member 132.

A compression spring 137 is positioned around the valve member 132 and engages a ledge 138 on the member 132, the compression spring 137 being located between the ledge 138 and a part 139 of the housing. A small passage 141 is formed through the wall of the valve member 132 and connects the lower end of the bore 134 with the interior of the pipe 26 and provides a vent to permit movement of air into and out of the lower end of the bore 133 as the member 133 moves upwardly or downwardly in the bore 134.

The valve member 132 is located within an air passage formed by a wall 142. A valve seat 143 is formed interioriorly of the air passage and is matable with a valve seat 144 formed on the lower end of the valve member 132. When the valve member 132 is displaced downwardly to the dashed line position, the surface 143 engages the seat 144 and prevents air flow through the pipe 26, but when the valve member 132 is displaced upwardly as shown by the solid line position shown in FIG. 2, by-pass air can flow past the valve member 132 and through the pipe 26. The seat 144 is preferably provided with a generally cylindrical portion 146 which extends closely adjacent the wall 147, and it has been found that the provision of the part 146 stabilizes the operation of the by-pass valve. Note that when the piston 123 and the sleeve 133 are in the up position, the spring 137 holds the member 132 on the seat 143. However, the member 132 operates as a check valve and opens to permit air flow from the intake manifold 16 to the exhaust manifold 19 when a pressure differential exists sufficient to overcome the spring 137. The check valve arrangement, however, prevents air flow in the opposite direction.

With reference again to FIG. 1, the lines 96 and 98 are connected to the intake manifold 16 as previously mentioned, and the control 41 responds to the static and total air pressures in the intake manifold at the outlet 17 of the compressor. While it is not essential, it is preferred that a venturi formed by a part 151 be provided in order to increase the strengths of the two air pressure signals. The static air pressure line 96 is connected to a passage 152 that opens in the throat of the venturi part 151, and the line 98 leads to a tube 153 which is disposed just downstream of the throat. The open end of the tube 153 faces in the upstream direction. The static air pressure at the throat of the venturi 151 appears in the passage 152 and in the line 96, and the total air pressure appears in the pipe 153 and the line 98. The total air pressure is equal to the static air pressure plus the dynamic air pressure caused by the movement of the compressor air through the venturi.

With reference again to FIG. 2, the static air pressure ($P_s$) appears on the upper side of the diaphragm 84 and the total air pressure ($P_t$) appears on the lower side. The static pressure acts on the full area ($A_1$) of the diaphragm while the total pressure acts on the full area minus the area ($A_2$) of the spool 83.

When the pressures produce a force balance $[P_s A_1 = P_t(A_1 - A_2)]$ the spool 83 is in the neutral position shown in FIG. 2 where the recess is not connected to either hole 112 or 113. Neither side of the bore 122 is pressurized and sleeve 133 will stay where it is at the time regardless of position.

If the static air pressure rises, relative to the total air pressure, from the above ratio the spool 83 is moved downwardly and the high pressure air in the line 66 is connected to the lower end of the bore 122. The piston 123 is urged upwardly and the air pressure in the intake manifold 16 opens the check valve and air is by-passed. If the dynamic pressure increases, the spool 83 moves upwardly and connects the high pressure line 66 to the upper end of the bore 122. This action urges the piston 123 down and operates to close the valve to reduce the amount of by-passed air.

The upper edge of the cup 81 acts as a stop and prevents the spool from moving too far upwardly. The surface 146 serves to stabilize operation of the valve 26. The control 41 serves as a pilot valve for amplifying the signals in the operation described above, but it should be understood that the control 41 could be dispensed with and the valve 29 could be arranged to be directly responsive to the air pressure.

FIG. 3 further illustrates the operation of the system, and shows variation in three factors plotted as functions of the mass of air flow in pounds per second and of air pressure in terms of boost pressure ratio. The curve 161 indicates the surge line of the compressor, the curve 162 indicates the by-passed turbocharger compressor output, and the curve 163 indicates the desired operating line. Assume that the engine is operating at a low speed with no by-pass, the mass or volume of air swallowed by the engine is indicated by 164, and the intake air pressure is indicated by 166. This point is to the left of the surge line 161, and the compressor 12 cannot operate in this region. The engine requirements can however be met by reason of the by-pass arrangement in accordance with this invention. When the compressor 12 output pressure starts to rise above the line 163, the increased static pressure moves the piston 123 upwardly and part of the compressor output is by-passed through the pipe 26. With the by-pass pipe open, the compressor 12 is enabled to produce a greater air flow. The compressor air flow moves to the line 167 while maintaining the pressure 166. The amount of air by-passed is the difference between the two lines 164 and 167. Consequently, the engine receives the required air pressure and air mass while the compressor 12 operates on the line 163 which is to the right of but close to the surge line 161 for maximum operating efficiency. A change in the engine speed will change the air mass requirements, but the compressor will continue to operate on the line 163 while the amount of by-passed air varies. When the valve 29 adjusts the by-passed air, the pressure conditions in the venturi 151 change but the operation quickly stabilizes.

It will be apparent from the foregoing that the constant ratio between the static and dynamic pressures at the compressor outlet produces an operating line 163 which parallels the surge line 161, and this ratio is utilized to regulate the amount of air by-passed in the pipe 26.

FIG. 4 is a graph of actual test data from the development of the system. Shown is the compressor surge line plus a variety of operating lines to either side of the surge line. Note that for the given diaphragm-spool diameter ratio, the operating line can be moved to either side of the surge line while remaining approximately parallel to the surge line. If another compressor where used where the surge line would have a different slope, it would be necessary for $A_1/A_2$ to equal a value other than 14.9. In addition to adjusting the location of the surge line, spring 82 and 102 (FIG. 2) tend to stabilize the system.

While the control 41 and the valve 29 could be used as a waste gate or anti-surge control arrangement, it is preferable to use them in conjunction with the ejector 31 and the exhaust manifold burner 42. As previously mentioned, it is difficult to start an LCR engine when it is cold, and the bypass pipe 26 cooperates with the burner 42 to aid in starting the engine. When the engine electrical system is initially turned on and the starter motor is energized, the engine is turned over and the fuel pump and the lubricant pump are operated. The exciter 49 also produces a spark at the plug 48. The lube pressure operates the switch 63 and opens the air valve 36. Initially the engine exhaust is not sufficient to drive the turbine 13, and the absence of an air pressure differential opens the valve 37. Air from the supply 34 flows through the nozzle 32 and this relatively small amount of air combines with the engine exhaust and flows through the burner 42. Fuel from the nozzle 43 combines with this air and is ignited by the spark plug 48, and the burner exhaust is enough to turn over the turbine 13. The compressor 12 is driven and supplies a larger quantity of air to the intake manifold 16. Some of this air is by-passed and is induced to flow through by-pass pipe 26 by the ejector 31. This increased amount of air flowing to the burner 42 results in increased burner exhaust and more power to drive the turbine 13. Thus, a "boot-strap" type of operation results as the turbocharger speeds up. The intake air is both compressed and heated by the compressor 12, and when the energy added to the intake air reaches a certain level, cylinder combustion occurs and the engine operates.

The ejector and/or the burner 42 may also be operated at other engine conditions to increase the engine power output and/or efficiency. The intake manifold burner 52 may also be operated to heat the intake air during starting and idling. The aftercooler 51 normally is not operated during starting.

We claim:

1. Apparatus for use in a diesel engine including at least one engine cylinder, a turbine-compressor having a surge line characteristic, an intake manifold connecting the compressor outlet to the cylinder, and an exhaust manifold connecting the turbine intake with the cylinder, said apparatus comprising a by-pass pipe adapted to be connected between said compressor outlet and said turbine intake, bypass valve means in said pipe for controlling the volume of by-passed air flowing out of said compressor outlet and through said pipe to said turbine intake, sensing means for sensing the static and dynamic air pressures at said compressor outlet and for regulating said bypass valve means in response to the ratio of the static and dynamic air pressures, said sensing means including pressure ratio responsive means for regulating said volume of by-passed air to maintain compressor operation adjacent to said surge line, and a burner mounted between said pipe and said turbine intake and connected to receive both by-passed air from said pipe and exhaust from the exhaust manifold.

2. Apparatus according to claim 1, and further including a venturi formed in said intake manifold, and said sensing means includes a first tube connected to the throat of said venturi for sensing static pressure, and a second tube extending into the throat of said venturi for sensing the combination of the static and dynamic pressures.

3. Apparatus according to claim 1, and further including a check valve in said pipe for enabling by-pass air to flow only from said intake manifold to said exhaust manifold.

4. Apparatus according to claim 1, and further including ejector means for ejecting air into said pipe and toward the burner.

5. Apparatus according to claim 1, wherein said sensing means includes a movable member for regulating said bypass valve means, said movable member having one side thereof responding to the static air pressure and another side thereof responding to the dynamic air pressure, and the position of said member being a function of said ratio.

6. In combination, a diesel engine including at least one cylinder having a relatively low compression ratio, a turbine-compressor having a surge line characteristic, air intake means connecting the compressor with the air intake of said cylinder, exhaust means connecting the exhaust of said cylinder with the turbine, a by-pass pipe connecting said intake and exhaust means in parallel with said engine cylinder, valve means in said by-pass pipe, sensing means connected to said valve means and to said intake means for sensing the static and dynamic air pressures in said intake means and for regulating the amount of by-passed air in accordance with the ratio of said static and dynamic pressures to maintain compressor operation adjacent said surge line and a burner connected in said exhaust means and receiving both by-passed air and engine exhaust.

7. The combination of claim 6, and further including an air ejector in said by-pass pipe.

* * * * *